United States Patent
Nomura

(10) Patent No.: US 10,446,151 B2
(45) Date of Patent: *Oct. 15, 2019

(54) SPEECH RECOGNITION METHOD AND SPEECH RECOGNITION APPARATUS

(71) Applicant: PANASONIC INTELLECTUAL PROPERTY CORPORATION OF AMERICA, Torrance, CA (US)

(72) Inventor: Kazuya Nomura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/822,926

(22) Filed: Nov. 27, 2017

(65) Prior Publication Data
US 2018/0082687 A1 Mar. 22, 2018

Related U.S. Application Data

(63) Continuation of application No. 14/428,093, filed as application No. PCT/JP2014/003608 on Jul. 8, 2014, now Pat. No. 9,865,255.
(Continued)

(51) Int. Cl.
*G10L 15/22* (2006.01)
*G10L 17/22* (2013.01)
(Continued)

(52) U.S. Cl.
CPC .............. *G10L 15/22* (2013.01); *G10L 17/22* (2013.01); *G10L 15/1807* (2013.01);
(Continued)

(58) Field of Classification Search
None
See application file for complete search history.

(56) References Cited

U.S. PATENT DOCUMENTS

| 4,864,623 A | 9/1989 | Van Nes et al. |
| 5,357,596 A | 10/1994 | Takebayashi et al. |

(Continued)

FOREIGN PATENT DOCUMENTS

| EP | 1085500 | 3/2001 |
| JP | 2001-154694 | 6/2001 |

(Continued)

OTHER PUBLICATIONS

International Search Report, dated Aug. 5, 2014 by the Japan Patent Office (JPO), in corresponding International Application No. PCT/JP2014/003608.
(Continued)

*Primary Examiner* — Abul K Azad
(74) *Attorney, Agent, or Firm* — Greenblum & Bernstein, P.L.C.

(57) ABSTRACT

A speech recognition method in a system is provided that controls one or more devices by using speech recognition. The method includes obtaining speech information representing speech spoken by a user, and determining whether the speech is spoken to the one or more devices. The method also includes generating, in a case where it is determined that the speech is spoken to the one or more devices, an operation instruction for the one or more devices. The determining whether the speech is spoken to the one or more devices includes analyzing a sentence pattern of the character information, determining, in a case where the sentence pattern is interrogative or imperative, that the speech is spoken to the one or more devices, and determining, in a case where the sentence pattern is declarative or exclamatory, that the speech is not spoken to the one or more devices.

2 Claims, 15 Drawing Sheets

Related U.S. Application Data

(60) Provisional application No. 61/973,411, filed on Apr. 1, 2014, provisional application No. 61/871,625, filed on Aug. 29, 2013.

(51) Int. Cl.
  *G10L 15/08* (2006.01)
  *G10L 15/18* (2013.01)

(52) U.S. Cl.
  CPC .. *G10L 2015/088* (2013.01); *G10L 2015/223* (2013.01); *G10L 2015/227* (2013.01)

(56) References Cited

U.S. PATENT DOCUMENTS

| | | | |
|---|---|---|---|
| 5,884,249 | A | 3/1999 | Namba et al. |
| 6,330,539 | B1 | 12/2001 | Takayama et al. |
| 8,032,383 | B1 | 10/2011 | Bhardwaj et al. |
| 8,044,791 | B2 | 10/2011 | Bulitta et al. |
| 8,165,886 | B1 | 4/2012 | Gagnon et al. |
| 8,374,859 | B2 | 2/2013 | Huang et al. |
| 8,725,505 | B2 | 5/2014 | Mowatt et al. |
| 8,762,156 | B2 | 6/2014 | Chen |
| 9,865,255 | B2 * | 1/2018 | Nomura .................. G10L 15/22 |
| 2004/0030560 | A1 | 2/2004 | Takami et al. |
| 2004/0127997 | A1 | 7/2004 | Tajika |
| 2004/0215443 | A1 * | 10/2004 | Hatton ................ G06F 17/2785 704/1 |
| 2006/0020473 | A1 | 1/2006 | Hiroe et al. |
| 2006/0047497 | A1 * | 3/2006 | Chen ........................ G06F 16/00 704/1 |
| 2007/0282765 | A1 * | 12/2007 | Visel ........................ G06N 3/10 706/14 |
| 2008/0221892 | A1 | 9/2008 | Nathan et al. |
| 2014/0074481 | A1 | 3/2014 | Newman |
| 2014/0122056 | A1 | 5/2014 | Duan |
| 2014/0195252 | A1 | 7/2014 | Gruber et al. |
| 2015/0243287 | A1 | 8/2015 | Nakano et al. |

FOREIGN PATENT DOCUMENTS

| | | |
|---|---|---|
| JP | 2001-207499 | 8/2001 |
| JP | 2006-048218 A | 2/2006 |
| JP | 2006-2154499 | 8/2006 |
| JP | 2008-309864 A | 12/2008 |
| JP | 2009-109535 | 5/2009 |
| JP | 2014-002586 | 1/2014 |

OTHER PUBLICATIONS

Indonesian Office Action, dated Jun. 29, 2018, for the related Indonesian Patent Application No. P-00201501442.

* cited by examiner

FIG. 6

| WORD 1 | WORD 2 | WORD 3 | OPERATION |
|---|---|---|---|
| TODAY | WEATHER | TELL ME / CHECK / HOW / … | OUTPUT : WEATHER [TODAY] |
| TOMORROW | WEATHER | TELL ME / CHECK / HOW / … | OUTPUT : WEATHER [ONE DAY LATER] |
| DAY AFTER TOMORROW | WEATHER | TELL ME / CHECK / HOW / … | OUTPUT : WEATHER [TWO DAYS LATER] |
| THREE DAYS LATER | WEATHER | TELL ME / CHECK / HOW / … | OUTPUT : WEATHER [THREE DAYS LATER] |
| … | … | … | … |

1401

| DAY | WEATHER |
|---|---|
| TODAY | SUNNY |
| ONE DAY LATER | CLOUDY |
| TWO DAYS LATER | RAINY |
| THREE DAYS LATER | PARTLY CLOUDY |
| ... | ... |

1402

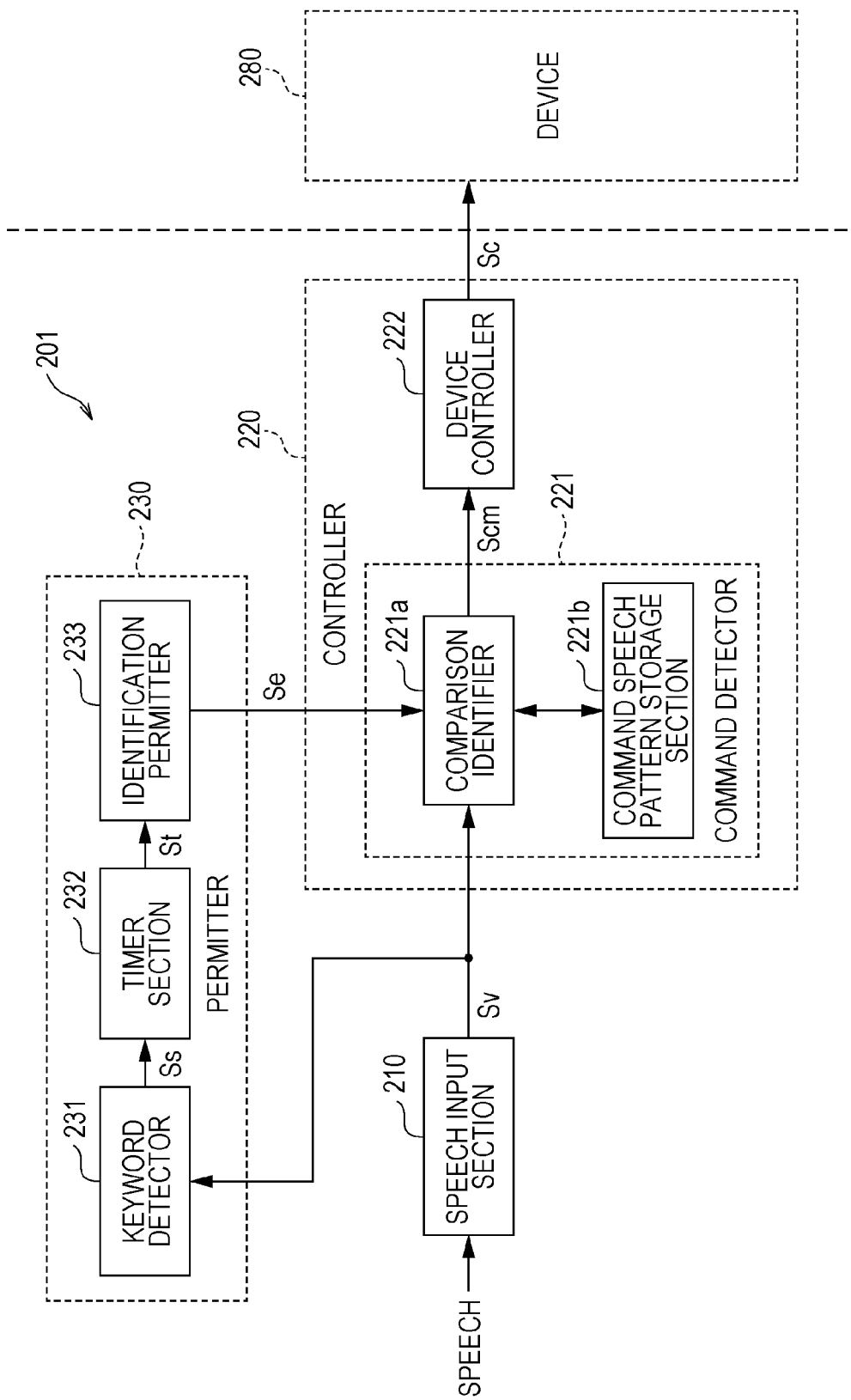

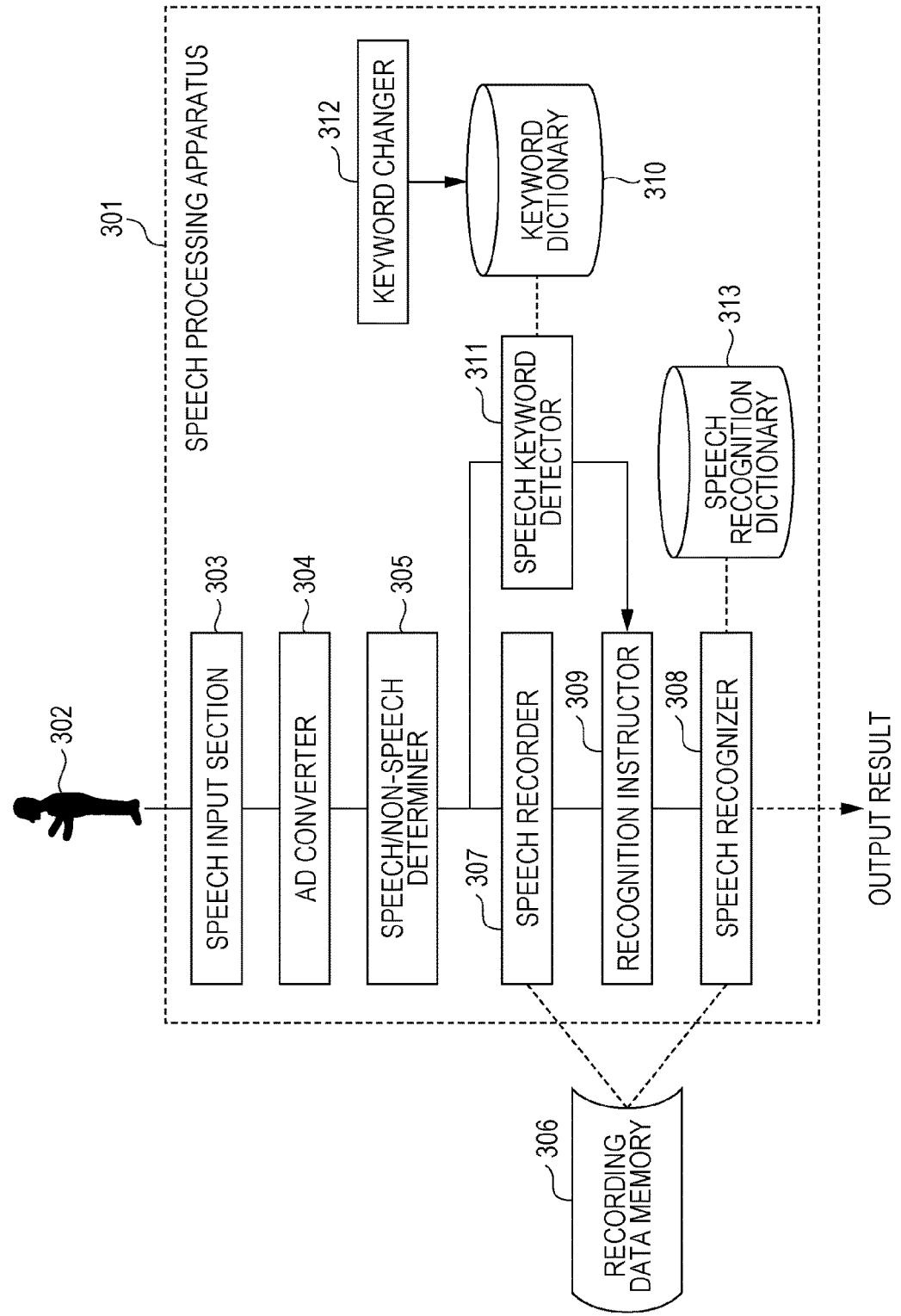

SPEECH RECOGNITION METHOD AND SPEECH RECOGNITION APPARATUS

This is a continuation of U.S. Pending application Ser. No. 14/428,093, filed Mar. 13, 2015, which is a National Stage Application of PCT/JP2014/003608, filed Jul. 8, 2014, which claims the benefit of U.S. Provisional Application No. 61/973,411, filed Apr. 1, 2014 and U.S. Provisional Application No. 61/871,625, filed Aug. 29, 2013. The disclosure of each of these documents including the specification, drawings and claims, are incorporated herein by reference in their entirety.

TECHNICAL FIELD

The present disclosure relates to a speech recognition method and a speech recognition apparatus that recognize input speech and control a device on the basis of the recognition result.

BACKGROUND ART

In a conventional speech recognition apparatus, when a speaker speaks to the speech recognition apparatus, it has been necessary to give the speech recognition apparatus a trigger for starting speech recognition. Triggers for speech recognition in conventional speech recognition apparatuses include pressing of a press-button switch, and detection of a pre-registered specific keyword (for example, see PTL 1 and 2).

CITATION LIST

Patent Literature

PTL 1: Japanese Unexamined Patent Application Publication No. 2001-154694
PTL 2: Japanese Unexamined Patent Application Publication No. 2006-215499

SUMMARY OF INVENTION

Technical Problem

In the above-mentioned conventional speech recognition apparatuses, further improvements have been necessary.

Solution to Problem

A speech recognition method according to an aspect of the present disclosure is a speech recognition method in a system that controls one or more devices by using speech recognition, including: a speech information obtaining step of obtaining speech information representing speech spoken by a user; a speech recognition step of recognizing the speech information, obtained in the speech information obtaining step, as character information; and a speaking determination step of determining, based on the character information recognized in the speech recognition step, whether the speech is spoken to the device(s).

Advantageous Effects of Invention

According to the present disclosure, further improvements of speech recognition can be achieved.

BRIEF DESCRIPTION OF DRAWINGS

FIG. 6 is a diagram illustrating an example of an operation table according to the first embodiment.
FIG. 14 is a block diagram illustrating the configuration of a conventional speech recognition apparatus described in PTL 1.
FIG. 15 is a block diagram illustrating the configuration of a conventional speech recognition apparatus described in PTL 2.

Figure 1:
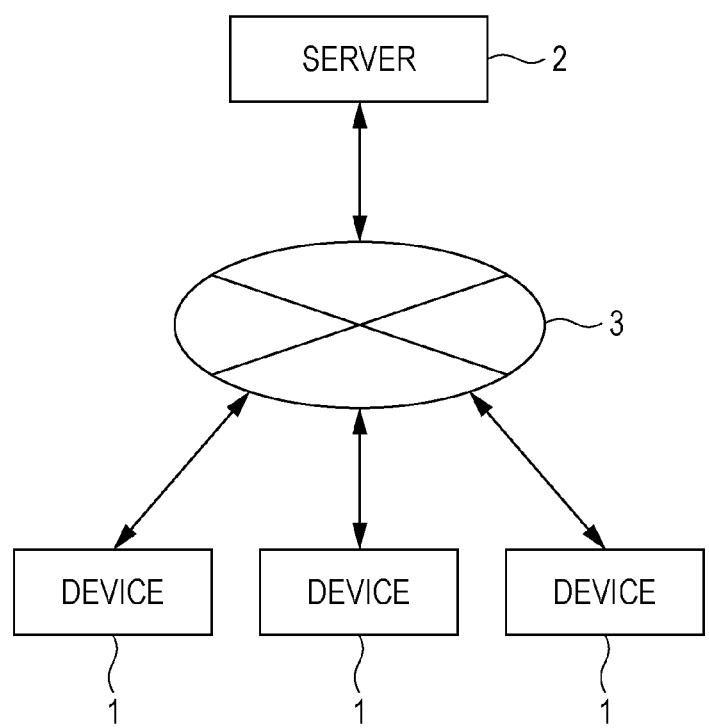
FIG. 1 is a block diagram illustrating the configuration of a speech recognition system according to a first embodiment of the present disclosure.

DESCRIPTION OF EMBODIMENTS (Findings that Form Basis of the Present Disclosure)

FIG. 14 is a block diagram illustrating the configuration of a conventional speech recognition apparatus described in PTL 1, and FIG. 15 is a block diagram illustrating the configuration of a conventional speech recognition apparatus described in PTL 2.

Referring to FIG. 14, a conventional speech recognition apparatus 201 includes a speech input section 210 for receiving a speech input, a controller 220 that detects a command from the speech input received by the speech input section 210 and controls a device on the basis of the detected command, and a permitter 230 that detects a certain keyword from the speech input received by the speech input section 210 and validates control of the device by the controller 220 for a certain command input period after the detection of the keyword.

As has been described above, according to PTL 1, since a keyword is received as a speech input, it is not necessary to operate a button or the like whenever the device is controlled. Therefore, a user can control the device even when the user is unable to press the button.

Referring to FIG. 15, a conventional speech recognition apparatus 301 includes a speech/non-speech determiner 305 that determines whether a sound input from a speech input section 303 is speech or non-speech, a keyword dictionary 310, a speech recognition dictionary 313, a speech recognizer 308 that performs speech recognition based on the speech recognition dictionary 313, a speech keyword detector 311 that detects whether a sound determined to be speech by the speech/non-speech determiner 305 is a word registered in advance in the keyword dictionary 310, and a recognition instructor 309 that outputs to the speech recognizer 308 an instruction to perform speech recognition of a sound input from the speech input section 303 at the time of detection that the sound input includes a word registered in the keyword dictionary 310. Accordingly, speech recognition is performed in response to the trigger that is speaking of a specific keyword after an intended command word is spoken by a user. The speech recognition apparatus 301 of PTL 2 is different from that of PTL 1 in that the speech recognition apparatus 301 can give a trigger for starting speech recognition without speaking of a pre-registered specific keyword before a command word is spoken.

However, the configuration of the speech recognition apparatus of PTL 1 has a problem that speaking a specific keyword for starting speech recognition is necessary before an intended command word. In addition, the configuration of the speech recognition apparatus of PTL 2 has a problem that speaking a specific keyword for starting speech recognition is necessary after an intended command word. In short, speech recognition will not be started unless a user speaks a specific keyword in either of the speech recognition apparatuses of PTL 1 and PTL 2.

It is conceivable to hide the sense of being a keyword by allowing a command word to also serve as a keyword for starting speech recognition. However, in this case, there is no change in the point that it is still necessary for the contents of speech to always include a keyword, and the speaker is required to speak while paying attention to a keyword.

From the above observations, the inventors have conceived aspects of the present disclosure.

Hereinafter, embodiments of the present disclosure will be described with reference to the drawings. Note that the following embodiments are only examples that embody the present disclosure and are not to be construed to limit the technical scope of the present disclosure.

(First Embodiment)

FIG. 1 is a block diagram illustrating the configuration of a speech recognition system according to a first embodiment of the present disclosure. The speech recognition system illustrated in FIG. 1 includes devices 1 and a server 2.

The devices 1 include home appliances located at home, for example. The devices 1 are connected to be communicable with the server 2 via a network 3. The network 3 is the Internet, for example.

Note that the devices 1 include a device that is capable of communicating with the network 3 (such as a smart phone, a personal computer, or a television) and a device that is not capable of communicating with the network 3 by itself (such as a lighting device, a washing machine, or a refrigerator). There may be a device that is incapable of communicating with the network 3 by itself but is capable of communicating with the network 3 via a home gateway. A device that is capable of communicating with the network 3 may be connected directly to the server 2, instead of using a home gateway.

The server 2 includes a conventional server computer, for example, and is connected to be communicable with the devices 1 via the network 3.

Figure 2:
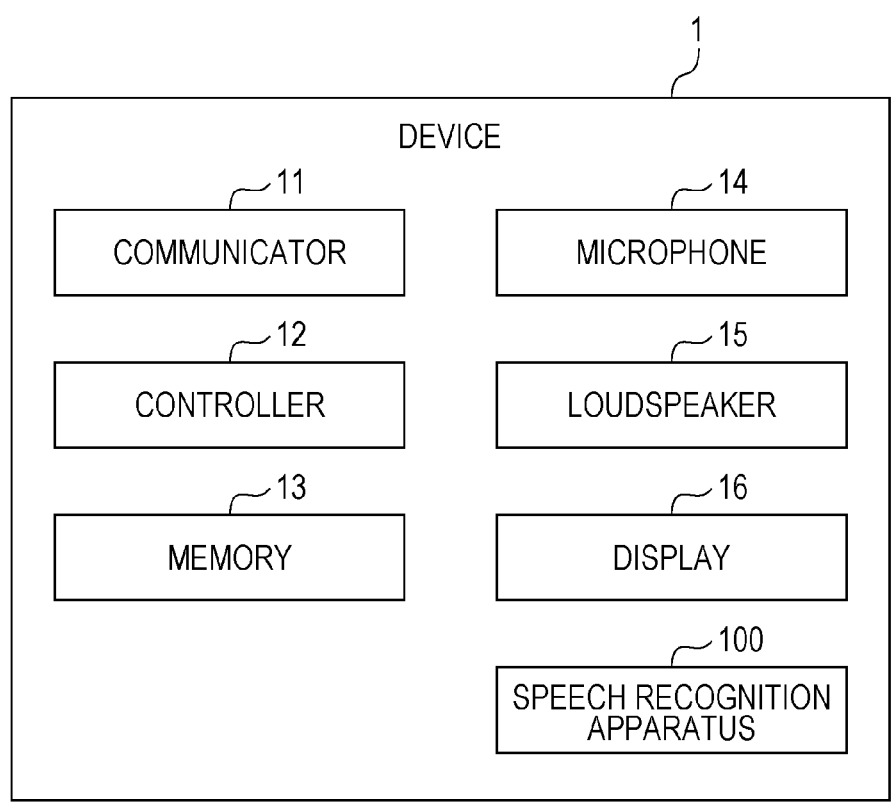
FIG. 2 is a block diagram illustrating the configuration of a device according to the first embodiment of the present disclosure.

FIG. 2 is a block diagram illustrating the configuration of each of the devices 1 according to the first embodiment of the present disclosure. The device 1 according to the first embodiment includes a communicator 11, a controller 12, a memory 13, a microphone 14, a loudspeaker 15, a display 16, and a speech recognition apparatus 100. Note that the device 1 may not necessarily include some of these elements or may include other elements.

The communicator 11 transmits information to the server 2 via the network 3 and receives information from the server 2 via the network 3. The controller 12 includes a CPU (central processing unit), for example, and controls the entire device 1.

The memory 13 includes a ROM (read-only memory) or a RAM (random-access memory), for example, and stores information. The microphone 14 converts speech to an electric signal and outputs the electric signal as speech information. The microphone 14 includes a microphone array including at least three microphones and collects sound in a space where the device 1 is located. The loudspeaker 15 outputs sound. The display 16 includes an LCD (liquid crystal display), for example, and displays various types of information.

The speech recognition apparatus 100 recognizes a user's speech and generates an operation instruction for causing the device 1 to operate. The controller 12 causes the device 1 to operate on the basis of an operation instruction in accordance with speech recognized by the speech recognition apparatus 100.

Figure 3:
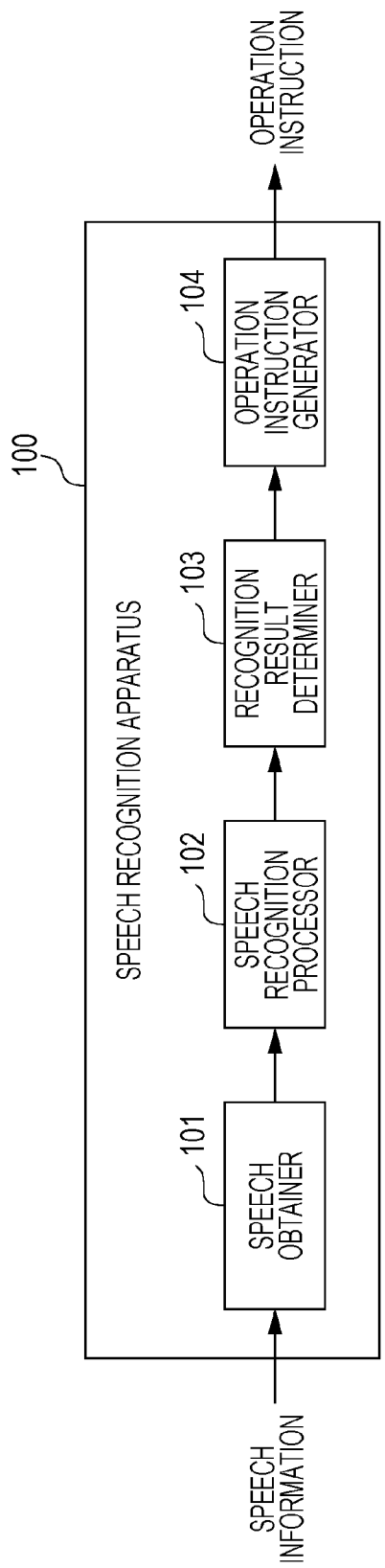
FIG. 3 is a block diagram illustrating the configuration of a speech recognition apparatus according to the first embodiment of the present disclosure.

FIG. 3 is a block diagram illustrating the configuration of a speech recognition apparatus according to the first embodiment of the present disclosure.

As illustrated in FIG. 3, the speech recognition apparatus 100 according to the first embodiment includes a speech obtainer 101, a speech recognition processor 102, a recognition result determiner 103, and an operation instruction generator 104.

The speech obtainer 101 obtains speech information representing speech spoken by a user. The speech obtainer 101 obtains speech information from the microphone 14. Specifically, the microphone 14 converts speech, which is an analog signal, to speech information, which is digital signal, and the speech obtainer 101 obtains the speech information, which has been converted to a digital signal, from the microphone 14. The speech obtainer 101 outputs the obtained speech information to the speech recognition processor 102.

The speech recognition processor 102 recognizes the speech information, obtained by the speech obtainer 101, as character information. The speech recognition processor 102 receives the speech information from the speech obtainer 101, performs speech recognition using a speech recognition dictionary, and outputs character information as a speech recognition result.

The recognition result determiner 103 determines, on the basis of the character information recognized by the speech recognition processor 102, whether the speech is spoken to the device 1. The recognition result determiner 103 analyzes the speech recognition result received from the speech recognition processor 102, and generates a recognition result parse tree corresponding to the speech recognition result. The recognition result determiner 103 analyzes the generated recognition result parse tree, and estimates the sentence pattern of the character information recognized by the speech recognition processor 102.

The recognition result determiner 103 analyzes the sentence pattern of the character information, determines whether the sentence pattern is interrogative or imperative, and, in the case where the sentence pattern is interrogative or imperative, determines that the speech is spoken to the device 1. In contrast, in the case where the sentence pattern is not interrogative or imperative, that is, in the case where the sentence pattern is declarative or exclamatory, the recognition result determiner 103 determines that the speech is not spoken to the device 1.

In the case where it is determined by the recognition result determiner 103 that the speech is spoken to the device 1, the operation instruction generator 104 generates an operation instruction for the device 1. On the basis of the determination result received from the recognition result determiner 103, the operation instruction generator 104 determines the device to which an operation instruction is to be sent and the operation contents, and generates an operation instruction including the determined operation contents for the determined device.

Figure 4:
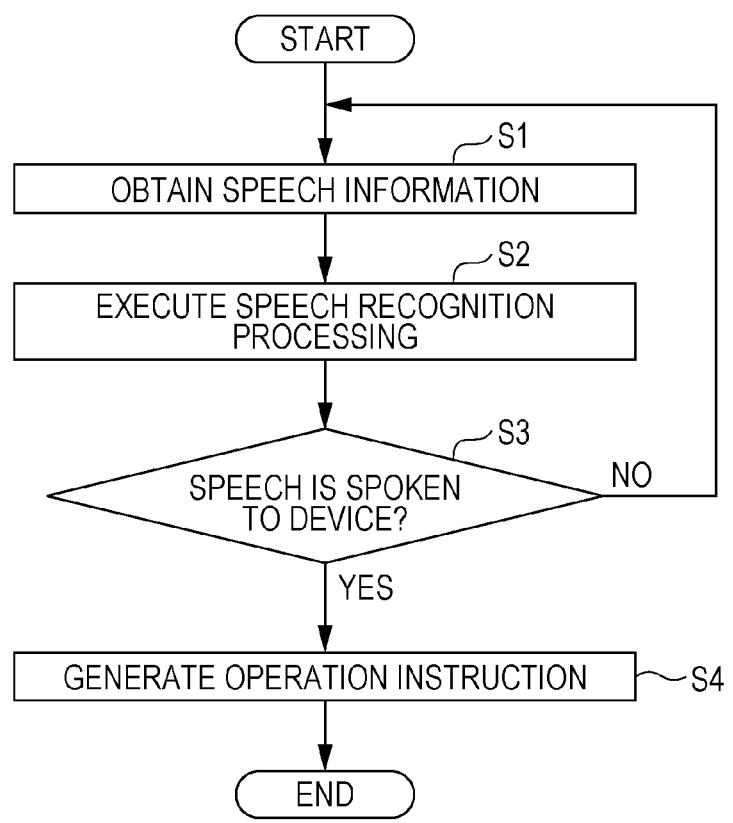
FIG. 4 is a flowchart for describing the operation of the speech recognition system according to the first embodiment of the present disclosure.

Here, the operation of the speech recognition system according to the first embodiment of the present disclosure will be described. FIG. 4 is a flowchart for describing the operation of the speech recognition system according to the first embodiment of the present disclosure.

First in step S1, the speech obtainer 101 obtains speech information from the microphone 14 provided on the device 1.

Next in step S2, the speech recognition processor 102 recognizes the speech information, obtained by the speech obtainer 101, as character information.

Next in step S3, the recognition result determiner 103 determines, on the basis of the character information recognized by the speech recognition processor 102, whether the speech is spoken to the device 1.

More specifically, the recognition result determiner 103 analyzes the syntax of the character information, recognized by the speech recognition processor 102, by using an existing syntax analysis technique. As the syntax analysis technique, for example, the analysis system indicated by URL: http://nlp.ist.i.kyoto-u.ac.jp/index.php?KNP can be used. The recognition result determiner 103 divides each sentence of the character information into a plurality of phrases, analyzes the part of speech of each phrase, and analyzes the conjugated form of each part of speech (declinable word or phrase). There are certain sentence patterns. Thus, the recognition result determiner 103 analyzes the sentence pattern of character information and determines whether the sentence pattern is one of declarative, interrogative, exclamatory, and imperative. In the case where the sentence pattern is either interrogative or imperative, the recognition result determiner 103 determines that the speech is spoken to the device 1. In the case where the sentence includes an interrogative word, for example, the recognition result determiner 103 is able to determine that the sentence pattern of the character information is interrogative. In addition, in the case where the conjugated form of a word at the end of the sentence is imperative, for example, the recognition result determiner 103 is able to determine that the sentence pattern of the character information is imperative.

In the case where it is determined in step S3 that the speech is not spoken to the device 1 (NO in step S3), the process returns to processing in step S1.

In contrast, in the case where it is determined in step S3 that the speech is spoken to the device 1 (YES in step S3), the operation instruction generator 104 generates, in step S4, an operation instruction for the device 1. The operation instruction generator 104 stores in advance an operation table where a combination of multiple words and a device operation are associated with each other. Note that the operation table will be described later. In the case where it is determined in step S3 that the speech is spoken to the device 1, the operation instruction generator 104 refers to the operation table, specifies a device operation corresponding to a combination of words included in the character information analyzed by the recognition result determiner 103, and generates an operation instruction for causing the device to perform the specified operation.

An example in which an inquiry about the weather forecast is made using the speech recognition apparatus with the above-described configuration will be described.

Figure 5A:
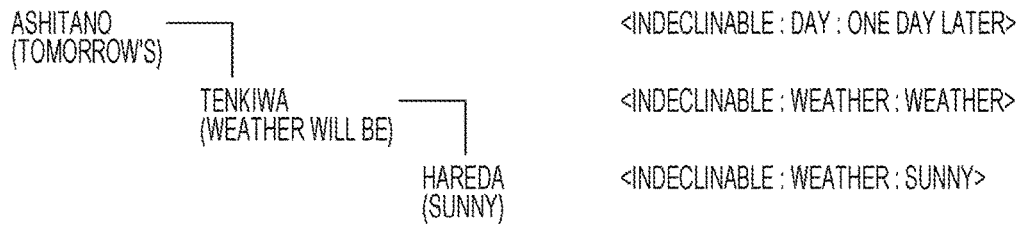
FIG. 5A is a diagram illustrating an example of character information whose sentence pattern is declarative.
Figure 5B:
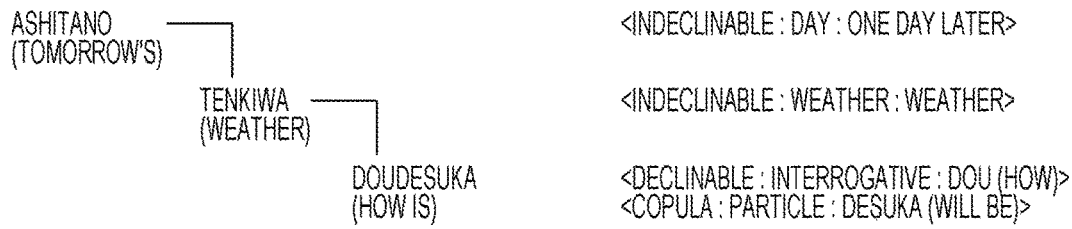
FIG. 5B is a diagram illustrating an example of character information whose sentence pattern is interrogative.
Figure 5C:
FIG. 5C is a diagram illustrating an example of character information whose sentence pattern is imperative.
Figure 5D:
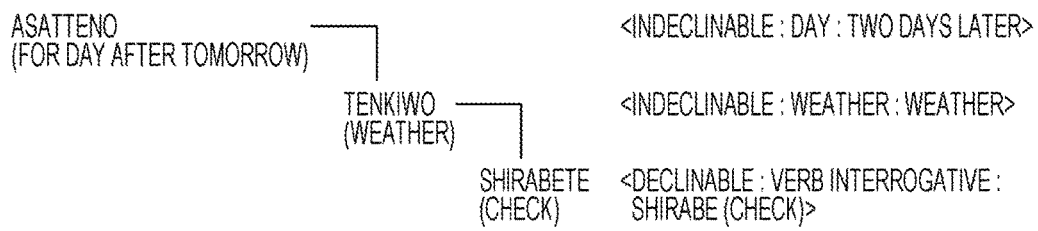
FIG. 5D is a diagram illustrating an example of character information whose sentence pattern is imperative.
Figure 5E:
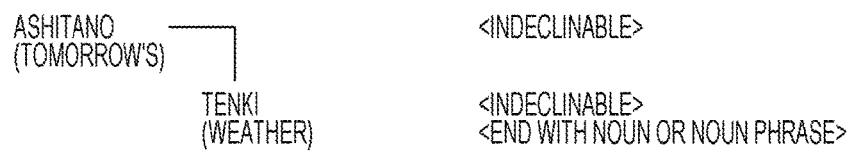
FIG. 5E is a diagram illustrating an example of character information whose sentence pattern is the pattern that ends with a noun or noun phrase.

FIG. 5A is a diagram illustrating an example of character information whose sentence pattern is declarative. FIG. 5B is a diagram illustrating an example of character information whose sentence pattern is interrogative. FIG. 5C is a diagram illustrating an example of character information whose sentence pattern is imperative. FIG. 5D is a diagram illustrating an example of character information whose sentence pattern is imperative. FIG. 5E is a diagram illustrating an example of character information whose sentence pattern is the pattern that ends a sentence with a noun or noun phrase.

Referring to FIG. 5A, when the speech obtainer 101 obtains the speech information "Ashitano tenkiwa hareda (Tomorrow's weather will be sunny)", the speech recognition processor 102 converts the speech information to the character information "Ashitano tenkiwa hareda (Tomorrow's weather will be sunny)". The speech recognition processor 102 outputs the recognized character information as a speech recognition result to the recognition result determiner 103.

The recognition result determiner 103 divides the character information recognized by the speech recognition processor 102 into the phrases "Ashitano (tomorrow's)", "tenkiwa (weather will be)", "hareda (sunny)", analyzes whether each phrase is indeclinable or declinable, and, if the phrase is declinable, analyzes the part of speech of a word included in that phrase. Referring to FIG. 5A, since the phrase at the end of the sentence is a copula, the recognition result determiner 103 determines that the sentence pattern of the character information is declarative. In the case where the recognition result determiner 103 determines that the sentence pattern is declarative, the recognition result determiner 103 determines that the speech is not spoken to the device 1.

In addition, referring to FIG. 5B, when the speech obtainer 101 obtains the speech information "Ashitano tenkiwa doudesuka (How is the weather tomorrow?)", the speech recognition processor 102 converts the speech information to the character information "Ashitano tenkiwa doudesuka (How is the weather tomorrow?)". The speech recognition processor 102 outputs the recognized character information as a speech recognition result to the recognition result determiner 103.

The recognition result determiner 103 divides the character information recognized by the speech recognition processor 102 into the phrases "Ashitano (tomorrow's)", "tenkiwa (weather)", "doudesuka (how is)", analyzes whether each phrase is indeclinable or declinable, and, if the phrase is declinable, analyzes the part of speech of a word included in that phrase. Referring to FIG. 5B, since the phrase at the end of the sentence includes an interrogative word, the recognition result determiner 103 determines that the sentence pattern of the character information is interrogative. In the case where the recognition result determiner 103 determines that the sentence pattern is interrogative, the recognition result determiner 103 determines that the speech is spoken to the device 1.

In the case where it is determined that the speech is spoken to the device 1, the operation instruction generator 104 refers to the operation table and generates an operation instruction for the device 1. FIG. 6 is a diagram illustrating an example of the operation table according to the first embodiment. In an operation table 1401, for example, as illustrated in FIG. 6, a word 1 that is a word string for determining date and time, a word 2 that is a word string for determining an operation purpose or a search target, and a word 3 that is a word string for determining whether the speech is spoken to the system are linked with one another.

In the example illustrated in FIG. 5B, the operation instruction generator 104 determines, by using the operation table 1401, the operation "output: weather [one day later]" from the word 1 "tomorrow", which represents date and time, the word 2 "weather", which represents a search target, and the word 3 "how", which represents that the speech is spoken to the system.

Figure 7:
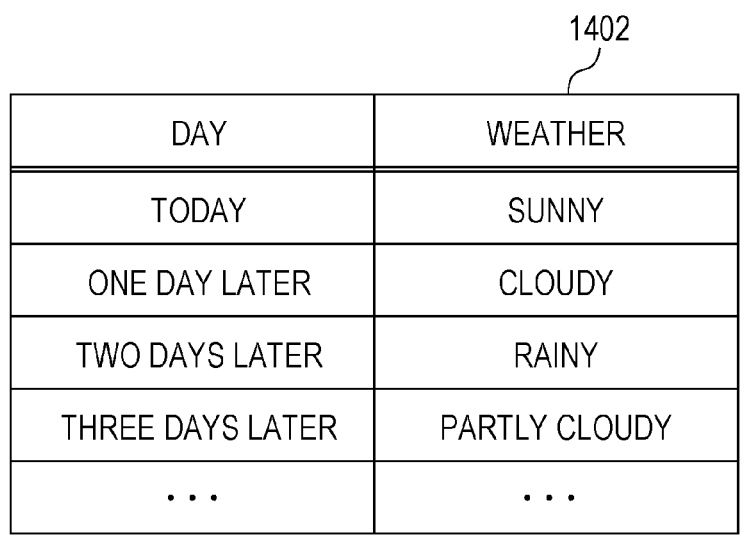
FIG. 7 is a diagram illustrating an example of a database regarding weather according to the first embodiment.

The operation instruction generator 104 outputs an operation instruction, to the controller 12 of the device 1, for obtaining the weather forecast for the next day from a server that provides weather forecasts. On the basis of the operation instruction from the operation instruction generator 104, the controller 12 accesses the server, which provides weather forecasts, obtains the weather forecast for the next day from a database regarding weather in the server, and outputs the obtained weather forecast from the display 16 or the loudspeaker 15. FIG. 7 is a diagram illustrating an example of a database regarding weather according to the first embodiment. In a database 1402 regarding weather, for example, as illustrated in FIG. 7, date and weather are linked with each other. Note that, in this case, the controller 12 transmits to the server, which provides weather forecasts, position information for specifying the current position of the device 1, thereby enabling obtaining of the weather forecast at the current position.

Next, referring to FIG. 5C, when the speech obtainer 101 obtains the speech information "Ashitano tenkiwo oshiete (Tell me tomorrow's weather), the speech recognition processor 102 converts the speech information to the character information "Ashitano tenkiwo oshiete (Tell me tomorrow's weather)". The speech recognition processor 102 outputs the recognized character information as a speech recognition result to the recognition result determiner 103.

The recognition result determiner 103 divides the character information recognized by the speech recognition processor 102 into the phrases "Ashitano (tomorrow's)", "tenkiwo (weather)", "oshiete (tell me)", analyzes whether each phrase is indeclinable or declinable, and, if the phrase is declinable, analyzes the part of speech of a word included in that phrase. Referring to FIG. 5C, since the conjugated form of a word at the end of the sentence is imperative, the recognition result determiner 103 determines that the sentence pattern of the character information is imperative. In the case where the recognition result determiner 103 determines that the sentence pattern is imperative, the recognition result determiner 103 determines that the speech is spoken to the device 1.

In the case where it is determined that the speech is spoken to the device 1, the operation instruction generator 104 generates an operation instruction for the device 1. In the example illustrated in FIG. 5C, the operation instruction generator 104 determines, by using the operation table 1401, the operation "output: weather [one day later]" from the word 1 "tomorrow", which represents date and time, the word 2 "weather", which represents a search target, and the word 3 "tell", which represents that the speech is spoken to the system.

The operation instruction generator 104 outputs an operation instruction, to the controller 12 of the device 1, for obtaining the weather forecast for the next day from the database 1402 regarding weather in the server, which provides weather forecasts. The operation of the controller 12 hereinafter is the same as that described above.

Next, referring to FIG. 5D, when the speech obtainer 101 obtains the speech information "Asatteno tenkiwo shirabete (Check the weather for the day after tomorrow)", the speech recognition processor 102 converts the speech information to the character information "Asatteno tenkiwo shirabete (Check the weather for the day after tomorrow)". The speech recognition processor 102 outputs the recognized character information as a speech recognition result to the recognition result determiner 103.

The recognition result determiner 103 divides the character information recognized by the speech recognition processor 102 into the phrases "Asatteno (for the day after tomorrow)", "tenkiwo (weather)", "shirabete (check)", analyzes whether each phrase is indeclinable or declinable, and, if the phrase is declinable, analyzes the part of speech of a word included in that phrase. Referring to FIG. 5D, since the conjugated form of a word at the end of the sentence is imperative, the recognition result determiner 103 determines that the sentence pattern of the character information is imperative. In the case where the recognition result determiner 103 determines that the sentence pattern is imperative, the recognition result determiner 103 determines that the speech is spoken to the device 1.

In the case where it is determined that the speech is spoken to the device 1, the operation instruction generator 104 generates an operation instruction for the device 1. In the example illustrated in FIG. 5D, the operation instruction generator 104 determines, by using the operation table 1401, the operation "output: weather [two days later]" from the word 1 "day after tomorrow", which represents date and time, the word 2 "weather", which represents a search target, and the word 3 "check", which represents that the speech is spoken to the system.

The operation instruction generator 104 outputs an operation instruction, to the controller 12 of the device 1, for obtaining the weather forecast for the next day from the database 1402 regarding weather in the server, which provides weather forecasts. The operation of the controller 12 hereinafter is the same as that described above.

Next, referring to FIG. 5E when the speech obtainer 101 obtains the speech information "Ashitano tenki (The weather tomorrow)", the speech recognition processor 102 converts the speech information to the character information "Ashitano tenki (The weather tomorrow)". The speech recognition processor 102 outputs the recognized character information as a speech recognition result to the recognition result determiner 103.

The recognition result determiner 103 divides the character information recognized by the speech recognition processor 102 into the phrases "Ashitano (for tomorrow)" and "tenki (weather)", analyzes whether each phrase is indeclinable or declinable, and, if the phrase is declinable, analyzes the part of speech of a word included in that phrase. Referring to FIG. 5E, since the word at the end of the sentence is indeclinable, the recognition result determiner 103 determines that the sentence pattern of the character information is the pattern that ends a sentence with a noun or noun phrase. In the case where the recognition result determiner 103 determines that the sentence pattern is the pattern that ends a sentence with a noun or noun phrase, the recognition result determiner 103 determines that the speech is spoken to the device 1.

In the case where it is determined that the speech is spoken to the device 1, the operation instruction generator 104 generates an operation instruction for the device 1. For example, in the operation table, a combination of the words "tomorrow" and "weather" and the operation to obtain a weather forecast are associated with each other. Therefore, the operation instruction generator 104 refers to the operation table, specifies the device operation to obtain a weather forecast, corresponding to a combination of the words "tomorrow" and "weather" included in the character information analyzed by the recognition result determiner 103, and generates an operation instruction for causing the device 1 to perform the specified operation.

The operation instruction generator 104 outputs the operation instruction, to the controller 12 of the device 1, for obtaining the weather forecast for the next day from the server, which provides weather forecasts. The operation of the controller 12 hereinafter is the same as that described above.

According to the above configuration, in the case where it is determined by the recognition result determiner 103 that the speech is spoken to the device 1, the operation instruction generator 104 generates an operation instruction for the device 1; and, in the case where it is determined by the recognition result determiner 103 that the speech is not spoken to the device 1, no operation instruction for the device 1 is generated. Thus, speaking a specific keyword that serves as a trigger for starting speech recognition becomes unnecessary. Therefore, the user can speak without paying attention to a specific keyword that serves as a trigger for starting speech recognition, and the user can operate the device using daily conversation.

Although the device 1 includes the speech recognition apparatus 100 in the present embodiment, the present disclosure is not limited thereto, and the server 2 may include the speech recognition apparatus 100. In this case, speech information obtained by the microphone 14 of the device 1 is transmitted to the server 2 via the network 3, and the speech recognition apparatus 100 of the server 2 executes processing in steps S1 to S4 of FIG. 4. In the case where it is determined that the speech is spoken to the device, the server 2 transmits an operation instruction for the device 1 on the basis of the speech recognition processing result, and the device 1 operates in accordance with the operation instruction from the server 2. This is applicable to other embodiments.

In addition, each functional block of the speech recognition apparatus 100 according to the present embodiment may be realized by a microprocessor operating in accordance with a computer program. In addition, each functional block of the speech recognition apparatus 100 may be realized as an LSI (large Scale Integration) which is typically an integrated circuit. Each functional block of the speech recognition apparatus 100 may be individually configured as a chip, or one or more functional blocks or some of the functional blocks may be configured as a chip. Further, each functional block of the speech recognition apparatus 100 may be realized by software or a combination of an LSI and software.

(Second Embodiment)

Next, a speech recognition apparatus according to a second embodiment will be described. The speech recognition apparatus according to the second embodiment measures a silent time and determines whether speech is spoken to the device 1 in accordance with the length of the measured silent time.

That is, in the case of detection of a user's speech after a silent state that lasts for a certain time or longer, it is highly likely that the user is speaking to the device (operation command). Therefore, in the second embodiment, the speech recognition apparatus measures a silent time from when obtaining of speech information is completed to when obtaining of the next speech information is started, and, in the case where the measured silent time is greater than or equal to a certain time, determines that the speech is spoken to the device 1.

Figure 8:
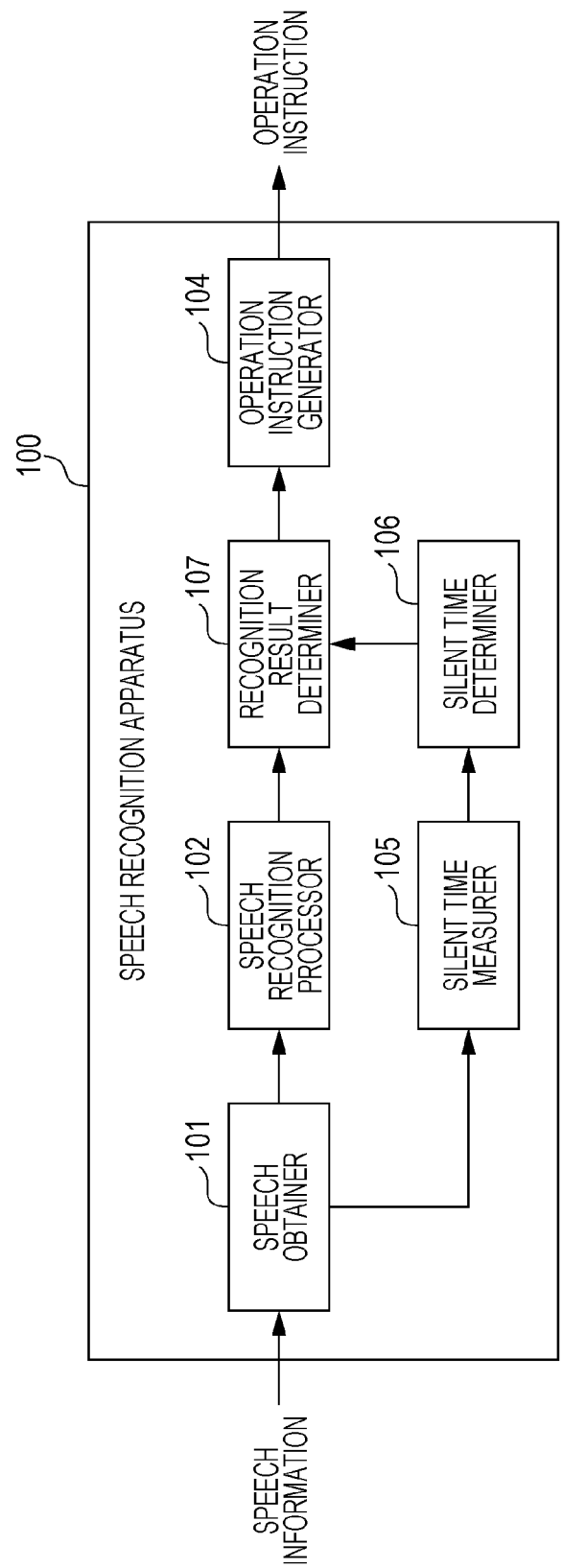
FIG. 8 is a block diagram illustrating the configuration of a speech recognition apparatus according to a second embodiment of the present disclosure.

FIG. 8 is a block diagram illustrating the configuration of the speech recognition apparatus according to the second embodiment of the present disclosure. Since the configuration of a speech recognition system according to the second embodiment is the same as the configuration of the speech recognition system according to the first embodiment, a description thereof is omitted. In addition, since the configuration of a device according to the second embodiment is the same as the configuration of the device 1 according to the first embodiment, a description thereof is omitted.

The speech recognition apparatus 100 according to the second embodiment includes the speech obtainer 101, the speech recognition processor 102, the operation instruction generator 104, a silent time measurer 105, a silent time determiner 106, and a recognition result determiner 107. In the speech recognition apparatus according to the second embodiment, the same configuration as that of the first embodiment is given the same reference numeral, and a description thereof is omitted.

The silent time measurer 105 measures, as a silent time, a time since obtaining of speech information by the speech obtainer 101 is completed.

In the case where speech information is obtained by the speech obtainer 101, the silent time determiner 106 determines whether the silent time measured by the silent time measurer 105 is greater than or equal to a certain time.

In the case where it is determined that the measured silent time is greater than or equal to the certain time, the recognition result determiner 107 determines that the speech is spoken to the device 1.

For example, in the case where speech information is obtained by the speech obtainer 101, the silent time determiner 106 determines whether the silent time measured by the silent time measurer 105 is greater than or equal to a time during which the user had been speaking. In addition, for example, in the case where it is determined that the measured silent time is greater than or equal to a predetermined certain time, the recognition result determiner 107 may determine that the speech is spoken to the device 1. Here, the predetermined certain time is 30 seconds, for example, which is a time based on which it is possible to determine that the user is not talking to another person.

According to the above configuration, a time since obtaining of speech information is completed is measured as a silent time, and, in response to obtaining of the next speech information, when it is determined that the measured silent time is greater than or equal to a certain time, it is determined that the speech is spoken to the device. Thus, the user can speak without paying attention to a specific keyword that serves as a trigger for starting speech recognition, and the user can operate the device using daily conversation.

When the user speaks after a silent time lasts for a certain time or longer and when a silent time after the user ends speaking is shorter than the certain time, it is highly likely that the user is talking to another person. Therefore, when speech information is obtained after a silent time lasts for a certain time or longer and when a silent time lasts for the certain time or longer after obtaining of the speech information is completed, the recognition result determiner 107 may determine that the speech is spoken to the device 1.

(Third Embodiment)

Next, a speech recognition apparatus according to a third embodiment will be described. The speech recognition apparatus according to the third embodiment determines whether a certain keyword regarding the operation of the device 1 is included in character information, and, in the case where the certain keyword is included in the character information, determines that the speech is spoken to the device 1.

Figure 9:
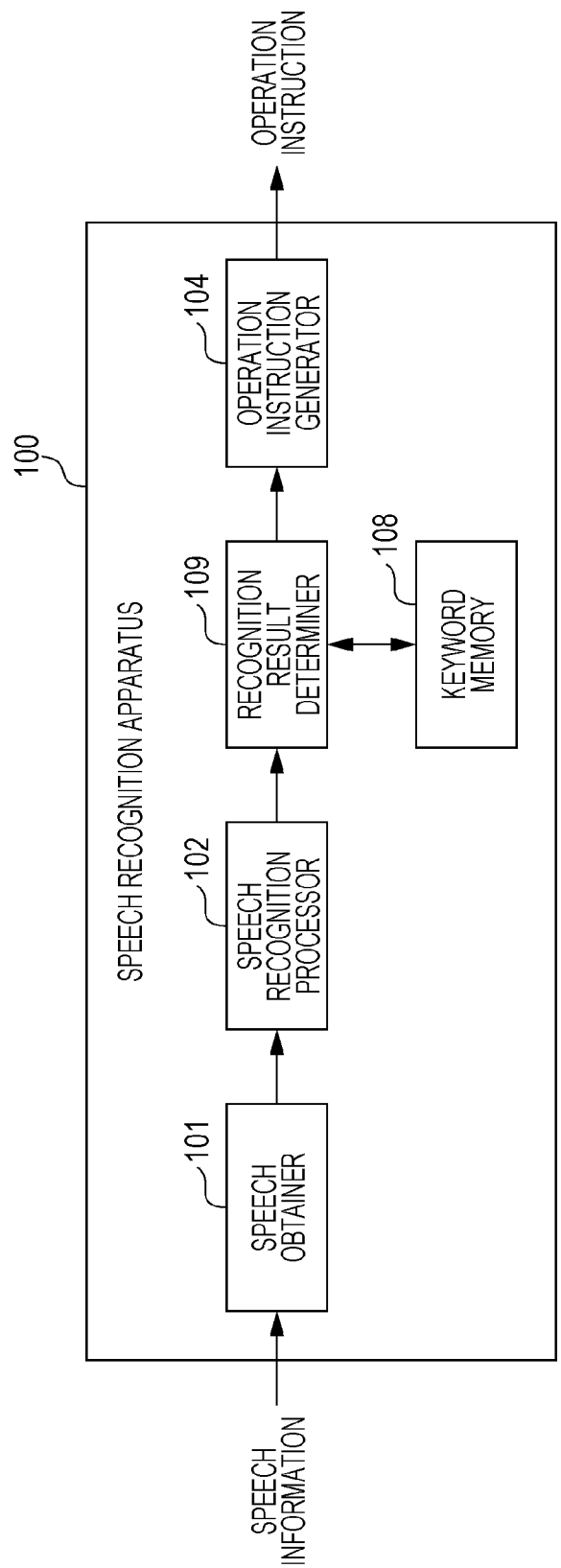
FIG. 9 is a block diagram illustrating the configuration of a speech recognition apparatus according to a third embodiment of the present disclosure.

FIG. 9 is a block diagram illustrating the configuration of the speech recognition apparatus according to the third embodiment of the present disclosure. Since the configuration of a speech recognition system according to the third embodiment is the same as the configuration of the speech recognition system according to the first embodiment, a description thereof is omitted. In addition, since the configuration of a device according to the third embodiment is the same as the configuration of the device 1 according to the first embodiment, a description thereof is omitted.

The speech recognition apparatus 100 according to the third embodiment includes the speech obtainer 101, the speech recognition processor 102, the operation instruction generator 104, a keyword memory 108, and a recognition result determiner 109. In the speech recognition apparatus according to the third embodiment, the same configuration as that of the first embodiment is given the same reference numeral, and a description thereof is omitted.

The keyword memory 108 stores in advance a certain keyword regarding the operation of the device.

The recognition result determiner 109 determines whether the pre-stored keyword is included in character information, and, in the case where the keyword is included in the character information, determines that the speech is spoken to the device 1.

For example, in the case where the device 1 is a television, the keyword memory 108 stores in advance the keywords "channel" and "change". The recognition result determiner 109 refers to the keyword memory 108 and, in the case where words included in the character information include the keywords "channel" and "change", determines that the speech is spoken to the device 1.

In this case, for example, in the operation table, a combination of the words "channel" and "change" and the operation to change the channel of the television are associated with each other. Therefore, the operation instruction generator 104 refers to the operation table, specifies the operation to change the channel of the television, corresponding to a combination of the words "channel" and "change" included in the character information analyzed by the recognition result determiner 103, and generates an operation instruction for causing the device 1 to perform the specified operation.

According to the above configuration, whether a certain keyword regarding the operation of the device is included in character information is determined, and, in the case where the certain keyword is included in the character information, it is determined that the speech is spoken to the device 1. Thus, the user can speak without paying attention to a specific keyword that serves as a trigger for starting speech recognition, and the user can operate the device using daily conversation.

(Fourth Embodiment)

Next, a speech recognition apparatus according to a fourth embodiment will be described. The speech recognition apparatus according to the fourth embodiment determines whether a pre-stored personal name is included in character information, and, in the case where the personal name is included in the character information, determines that the speech is not spoken to the device 1.

That is, in the case where the user's speech includes a personal name, such as the name of a family member, it is highly likely that the user is talking to a person with that name, and it is highly likely that the user is not speaking to the device. Therefore, the speech recognition apparatus according to the fourth embodiment stores in advance a personal name, such as the name of a family member, and, in the case where the pre-stored personal name is included in character information, determines that the speech is not spoken to the device 1.

Figure 10:
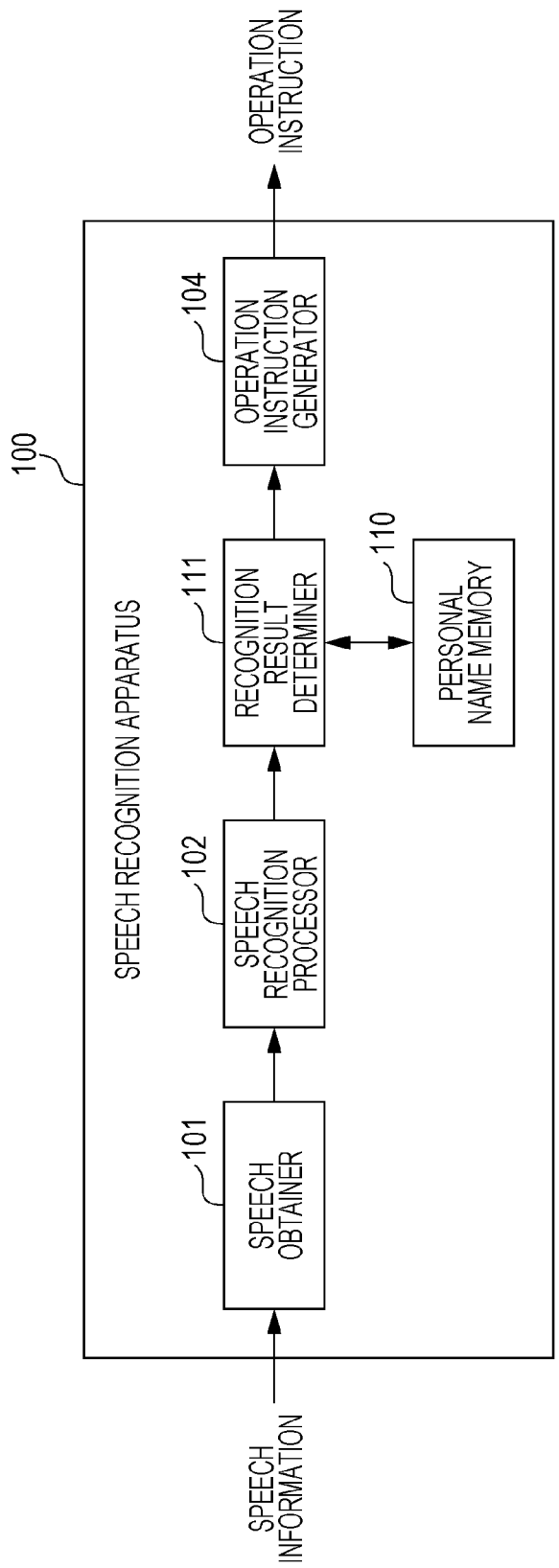
FIG. 10 is a block diagram illustrating the configuration of a speech recognition apparatus according to a fourth embodiment of the present disclosure.

FIG. 10 is a block diagram illustrating the configuration of the speech recognition apparatus according to the fourth embodiment of the present disclosure. Since the configuration of a speech recognition system according to the fourth embodiment is the same as the configuration of the speech recognition system according to the first embodiment, a description thereof is omitted. In addition, since the configuration of a device according to the fourth embodiment is the same as the configuration of the device according to the first embodiment, a description thereof is omitted.

The speech recognition apparatus 100 according to the fourth embodiment includes the speech obtainer 101, the speech recognition processor 102, the operation instruction generator 104, a personal name memory 110, and a recognition result determiner 111. In the speech recognition apparatus according to the fourth embodiment, the same configuration as that of the first embodiment is given the same reference numeral, and a description thereof is omitted.

The personal name memory 110 stores in advance a personal name. Here, the personal name memory 110 stores in advance the name of a family member who lives in a house where the device 1 is located or the name of a family member of a user who owns the device 1. In addition, the personal name memory 110 may store in advance the nickname of a family member, such as Dad, Mom, or Big Brother. Note that a personal name is input by the user using an input acceptor (not illustrated) included in the device 1 and is stored in the personal name memory 110.

The recognition result determiner 111 determines whether a personal name or a nickname stored in advance in the personal name memory 110 is included in character information, and, in the case where the personal name or nickname is included in the character information, determines that the speech is not spoken to the device 1. Note that, in the case where the name of a family member is stored as user information in the server 2, the recognition result determiner 111 may perform determination using the user information stored in the server 2.

In addition, as in the first embodiment, the recognition result determiner 111 analyzes the sentence pattern of character information, determines whether the sentence pattern is interrogative or imperative, and, in the case where the sentence pattern is interrogative or imperative, determines that the speech is spoken to the device 1. At this time, even in the case where it is determined that the sentence pattern is interrogative or imperative, if a personal name or a nickname stored in advance in the personal name memory 110 is included in the character information, the recognition result determiner 111 determines that the speech is not spoken to the device 1. That is, in the case where it is determined that the sentence pattern is interrogative or imperative and a personal name or a nickname stored in advance in the personal name memory 110 is not included in the character information, the recognition result determiner 111 determines that the speech is spoken to the device 1.

According to the above configuration, whether a pre-stored personal name or nickname is included in character information is determined, and, in the case where the personal name or nickname is included in the character information, it is determined that the speech is not spoken to the device 1. Thus, the user can speak without paying attention to a specific keyword that serves as a trigger for starting speech recognition, and the user can operate the device using daily conversation.

(Fifth Embodiment)

Next, a speech recognition apparatus according to a fifth embodiment will be described. The speech recognition apparatus according to the fifth embodiment detects a person in a space where the device 1 is located, determines that the speech is not spoken to the device 1 in response to detection of a plurality of people, and determines that the speech is spoken to the device 1 in response to detection of one person.

That is, in the case where there is a plurality of people in a space where the device 1 is located, it is highly likely that the user is talking to another person, and it is highly likely that the user is not speaking to the device 1. In contrast, in the case where there is only one person in a space where the device 1 is located, it is highly likely that the user is speaking to the device 1. Therefore, in the fifth embodiment, in response to detection of a plurality of people in a space where the device 1 is located, the speech recognition apparatus determines that the speech is not spoken to the device 1. In addition, in response to detection of one person in a space where the device 1 is located, the speech recognition apparatus determines that the speech is spoken to the device 1.

Figure 11:
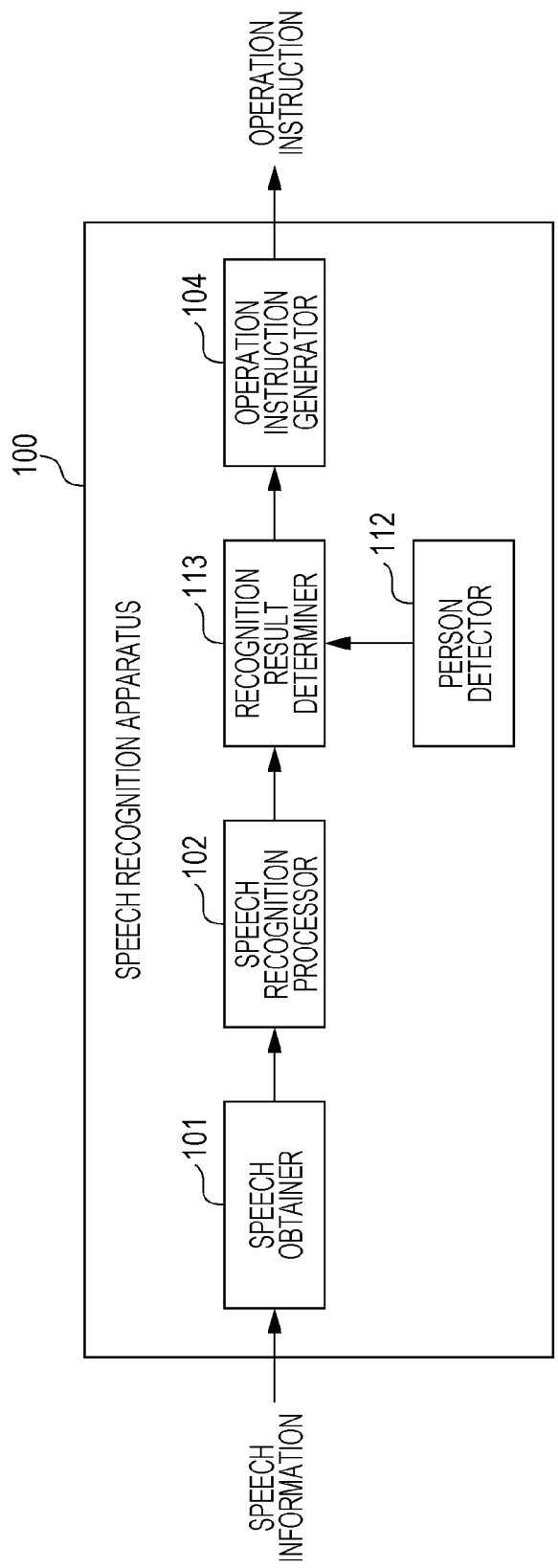
FIG. 11 is a block diagram illustrating the configuration of a speech recognition apparatus according to a fifth embodiment of the present disclosure.

FIG. 11 is a block diagram illustrating the configuration of the speech recognition apparatus according to the fifth embodiment of the present disclosure. Since the configuration of a speech recognition system according to the fifth embodiment is the same as the configuration of the speech recognition system according to the first embodiment, a description thereof is omitted. In addition, since the configuration of a device according to the fifth embodiment is the same as the configuration of the device 1 according to the first embodiment, a description thereof is omitted.

The speech recognition apparatus 100 according to the fifth embodiment includes the speech obtainer 101, the speech recognition processor 102, the operation instruction generator 104, a person detector 112, and a recognition result determiner 113. In the speech recognition apparatus according to the fifth embodiment, the same configuration as that of the first embodiment is given the same reference numeral, and a description thereof is omitted.

The person detector 112 detects a person in a space where the device is located. Note that the person detector 112 may detect a person by analyzing an image obtained from a camera included in the device 1. Alternatively, the person detector 112 may detect a person using a motion sensor or a heat sensor.

In response to detection of a plurality of people by the person detector 112, the recognition result determiner 113 determines that the speech is not spoken to the device 1; and, in response to detection of one person by the person detector 112, the recognition result determiner 113 determines that the speech is spoken to the device 1.

In addition, as in the first embodiment, the recognition result determiner 113 analyzes the sentence pattern of character information, determines whether the sentence pattern is interrogative or imperative, and, in the case where the sentence pattern is interrogative or imperative, determines that the speech is spoken to the device 1. At this time, even in the case where it is determined that the sentence pattern is interrogative or imperative, if a plurality of people is detected by the person detector 112, the recognition result determiner 113 determines that the speech is not spoken to the device 1. That is, in the case where the sentence pattern is interrogative or imperative and a plurality of people is not detected by the person detector 112 (one person is detected), the recognition result determiner 111 determines that the speech is spoken to the device 1.

According to the above configuration, it is determined that the speech is not spoken to the device in response to detection of a plurality of people, and it is determined that the speech is spoken to the device in response to detection of one person. Thus, the user can speak without paying attention to a specific keyword that serves as a trigger for starting speech recognition, and the user can operate the device using daily conversation.

(Sixth Embodiment)

Next, a speech recognition apparatus according to a sixth embodiment will be described. The speech recognition apparatus according to the sixth embodiment determines whether the conjugated form of a declinable word or phrase included in character information is imperative, and, in the case where the conjugated form is imperative, determines that the speech is spoken to the device 1.

That is, in the case where the conjugated form of a declinable word or phrase included in character information is imperative, it is highly likely that the user is speaking to the device 1. Therefore, in the sixth embodiment, the speech recognition apparatus determines the conjugated form of a declinable word or phrase included in character information, and, in the case where the conjugated form is imperative, determines that the speech is spoken to the device 1.

Figure 12:
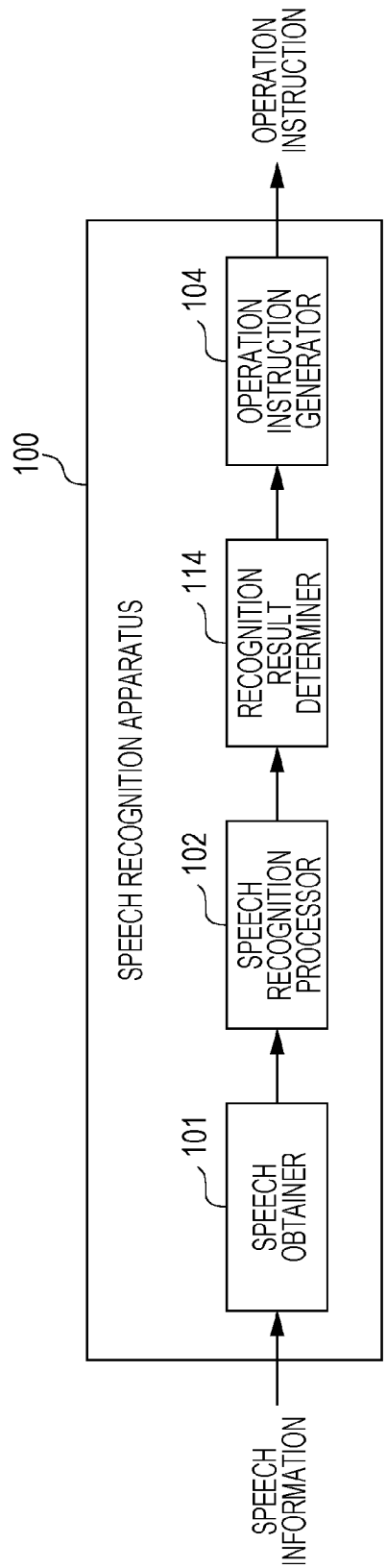
FIG. 12 is a block diagram illustrating the configuration of a speech recognition apparatus according to a sixth embodiment of the present disclosure.

FIG. 12 is a block diagram illustrating the configuration of the speech recognition apparatus according to the sixth embodiment of the present disclosure. Since the configuration of a speech recognition system according to the sixth embodiment is the same as the configuration of the speech recognition system according to the first embodiment, a description thereof is omitted. In addition, since the configuration of a device according to the sixth embodiment is the same as the configuration of the device 1 according to the first embodiment, a description thereof is omitted.

The speech recognition apparatus 100 according to the sixth embodiment includes the speech obtainer 101, the speech recognition processor 102, the operation instruction generator 104, and a recognition result determiner 114. In the speech recognition apparatus according to the sixth embodiment, the same configuration as that of the first embodiment is given the same reference numeral, and a description thereof is omitted.

The recognition result determiner 114 analyzes whether the conjugated form of a declinable word or phrase included in character information is one of irrealis, adverbial, conclusive, attributive, realis, and imperative. The recognition result determiner 114 determines whether the conjugated form of a declinable word or phrase included in character information is imperative, and, in the case where the conjugated form is imperative, determines that the speech is spoken to the device 1. The recognition result determiner 114 divides each sentence of the character information into a plurality of phrases, analyzes the part of speech of each phrase, and analyzes the conjugated form of each part of speech (declinable word or phrase). In the case where a phrase whose conjugated form is imperative is included in the character information, the recognition result determiner 114 determines that the speech is spoken to the device 1.

In addition, in the case where the conjugated form is not imperative, that is, in the case where the conjugated form is irrealis, adverbial, conclusive, attributive, or realis, the recognition result determiner 114 determines that the speech is not spoken to the device 1.

According to the above configuration, whether the conjugated form of a declinable word or phrase included in character information is imperative is determined, and, in the case where the conjugated form is imperative, it is determined that the speech is spoken to the device 1. Thus, the user can speak without paying attention to a specific keyword that serves as a trigger for starting speech recognition, and the user can operate the device using daily conversation.

Note that the recognition result determiner 114 may determine whether the conjugated form of a declinable word or phrase included in character information is conclusive or imperative, and, in the case where the conjugated form is conclusive or imperative, may determine that the speech is spoken to the device 1.

Note that a speech recognition apparatus according to the present disclosure may combine the speech recognition apparatuses according to the above-described first to sixth embodiments.

(Seventh Embodiment)

Next, a speech recognition apparatus according to a seventh embodiment will be described. The speech recognition apparatus according to the seventh embodiment adds weight values given in accordance with certain determination results for character information, determines whether the sum weight value is greater than or equal to a certain value, and, in the case where the sum weight value is greater than or equal to the certain value, determines that the speech is spoken to the device 1.

Figure 13:
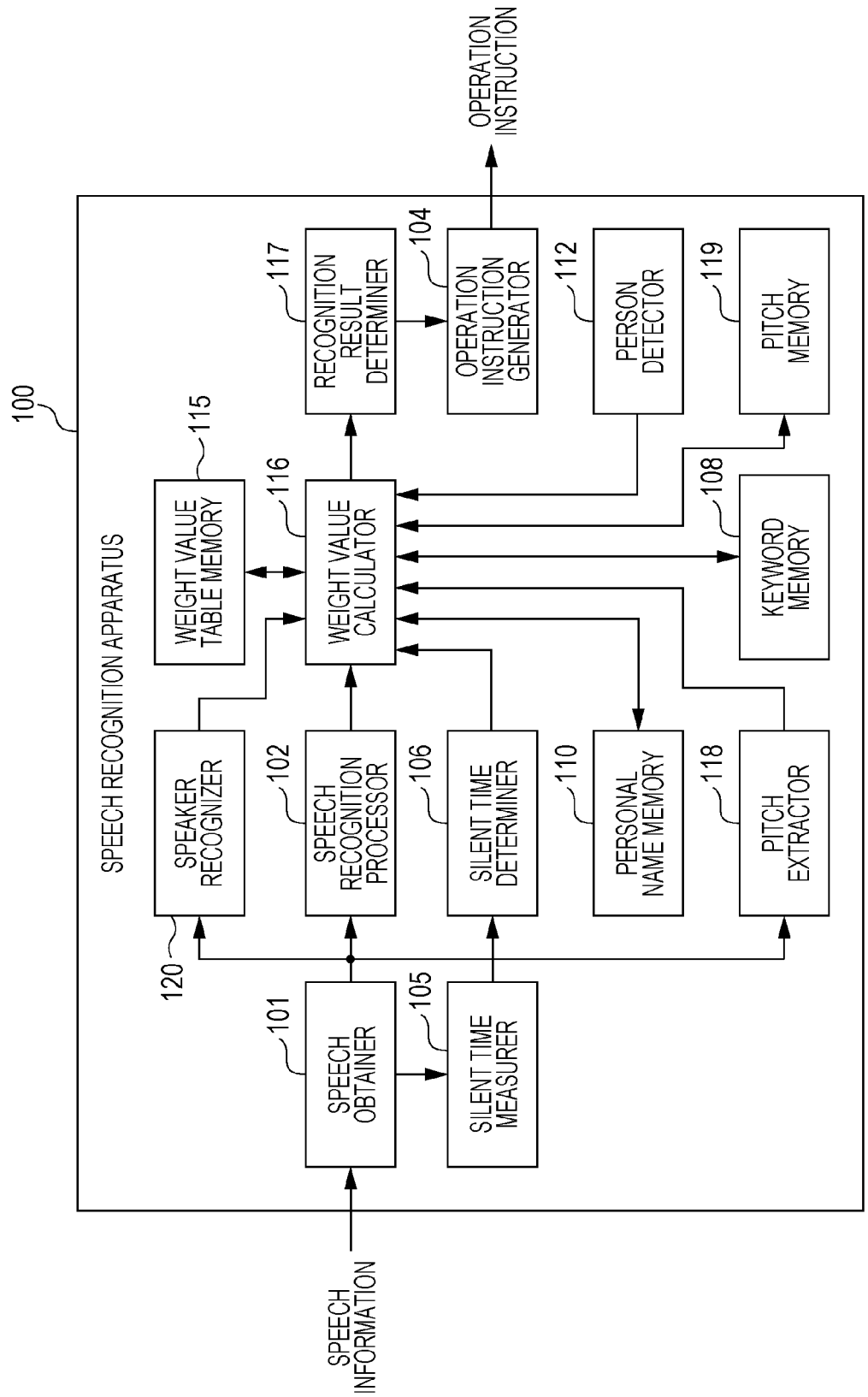
FIG. 13 is a block diagram illustrating the configuration of a speech recognition apparatus according to a seventh embodiment of the present disclosure.

FIG. 13 is a block diagram illustrating the configuration of the speech recognition apparatus according to the seventh embodiment of the present disclosure. Since the configuration of a speech recognition system according to the seventh embodiment is the same as the configuration of the speech recognition system according to the first embodiment, a description thereof is omitted. In addition, since the configuration of a device according to the seventh embodiment is the same as the configuration of the device 1 according to the first embodiment, a description thereof is omitted.

The speech recognition apparatus 100 according to the seventh embodiment includes the speech obtainer 101, the speech recognition processor 102, the operation instruction generator 104, the silent time measurer 105, the silent time determiner 106, the keyword memory 108, the personal name memory 110, the person detector 112, a weight value table memory 115, a weight value calculator 116, a recognition result determiner 117, a pitch extractor 118, a pitch memory 119, and a speaker recognizer 120. In the speech recognition apparatus according to the seventh embodiment, the same configuration as that of the first to sixth embodiments is given the same reference numeral, and a description thereof is omitted.

The weight value table memory 115 stores a weight value table in which a certain determination result for character information and a weight value are associated with each other. In the weight value table, the determination result that the sentence pattern of character information is interrogative or imperative is associated with a first weight value. In addition, in the weight value table, the determination result that a silent time from when obtaining of speech information is completed to when obtaining of the next speech information is started is greater than or equal to a certain time is associated with a second weight value. In addition, in the weight value table, the determination result that a pre-stored keyword is included in character information is associated with a third weight value. In addition, in the weight value table, the determination result that a pre-stored personal name or nickname is included in character information is associated with a fourth weight value. In addition, in the weight value table, the determination result that a plurality of people is detected is associated with a fifth weight value. In addition, in the weight value table, the determination result that one person is detected is associated with a sixth weight value. In addition, in the weight value table, the determination result that the conjugated form of a declinable word or phrase included in character information is imperative is associated with a seventh weight value. In addition, in the weight value table, the pitch frequency of speech information is associated with an eighth weight value.

The weight value calculator 116 adds weight values given in accordance with certain determination results for character information. The weight value calculator 116 adds a weight value given in accordance with whether the sentence pattern of character information is interrogative or imperative, a weight value given in accordance with whether a silent time from when obtaining of speech information is completed to when obtaining of the next speech information is started is greater than or equal to a certain time, a weight value given in accordance with whether a pre-stored certain keyword regarding the operation of the device is included in the character information, a weight value given in accordance with whether a pre-stored personal name is included in the character information, a weight value given in accordance with whether a plurality of people is detected in a space where the device is located, a weight value given in accordance with whether the conjugated form of a declinable word or phrase included in the character information is imperative, and a weight value given in accordance with whether the pitch frequency of the speech information is greater than or equal to a certain threshold.

The weight value calculator 116 analyzes the sentence pattern of character information recognized by the speech recognition processor 102, determines whether the sentence pattern is interrogative or imperative, and, in the case where the sentence pattern is interrogative or imperative, reads the corresponding first weight value from the weight value table memory 115.

In addition, in the case where it is determined by the silent time determiner 106 that a silent time from when obtaining of speech information is completed to obtaining of the next speech information is started by the speech obtainer 101 is greater than or equal to a certain time, the weight value calculator 116 reads the corresponding second weight value from the weight value table memory 115.

In addition, the weight value calculator 116 determines whether a keyword stored in advance in the keyword memory 108 is included in character information recognized by the speech recognition processor 102, and, in the case where the keyword is included in the character information, reads the corresponding third weight value from the weight value table memory 115.

In addition, the weight value calculator 116 determines whether a personal name or a nickname stored in advance in the personal name memory 110 is included in character information recognized by the speech recognition processor 102, and, in the case where the personal name or nickname is included in the character information, reads the corresponding fourth weight value from the weight value table memory 115.

In addition, in the case where a plurality of people is detected by the person detector 112, the weight value calculator 116 reads the corresponding fifth weight value from the weight value table memory 115.

In addition, in the case where one person is detected by the person detector 112, the weight value calculator 116 reads the corresponding sixth weight value from the weight value table memory 115.

In addition, the weight value calculator 116 determines whether the conjugated form of a declinable word or phrase included in character information recognized by the speech recognition processor 102 is imperative, and, in the case where the conjugated form is imperative, reads the corresponding seventh weight value from the weight value table memory 115.

In addition, in the case where the pitch frequency of speech information is greater than or equal to a certain threshold, the weight value calculator 116 reads the corresponding eighth weight value from the weight value table memory 115. Specifically, the weight value calculator 116 stores, for each speech, a pitch frequency extracted by the pitch extractor 118 from input speech information and speaker information recognized by the speaker recognizer 120 are stored as a pair in the pitch memory 119. In response to a new speech input, a pitch frequency extracted by the pitch extractor 118 from the input speech information and speaker information recognized by the speaker recognizer 120 are stored as a pair in the pitch memory 119. At the same time, the pitch frequency of the previous speech of the same speaker is compared with the pitch frequency of this speech, and, in the case where the pitch frequency of this speech is higher exceeding a preset threshold, the corresponding eighth weight value is read from the weight value table memory 115. Alternatively, instead of using speaker recognition by the speaker recognizer 120, the eighth weight value may be read by using a fixed threshold, regardless of the speaker.

In addition, the weight value calculator 116 adds the read weight values.

Note that, in the case where it is determined that the sentence pattern of character information is not interrogative or imperative, a silent time from when obtaining of speech information is completed to when obtaining of the next speech information is started is not greater than or equal to a certain time, a pre-stored keyword is not included in the character information, a pre-stored personal name or nickname is not included in the character information, or the conjugated form of a declinable word or phrase included in the character information is not imperative, the weight value calculator 116 does not add the weight values.

The recognition result determiner 117 determines whether the sum of the weight value added by the weight value calculator 116 is greater than or equal to a certain value, and, in the case where the sum weight value is greater than or equal to the certain value, determines that the speech is spoken to the device 1.

Note that it is preferable that the first weight value, the second weight value, the third weight value, the sixth weight value, and the seventh weight value be higher than the fourth weight value and the fifth weight value. The first weight value, the second weight value, the third weight value, the sixth weight value, and the seventh weight value are "5", for example, the fourth weight value is "−5", for example, and the fifth weight value is "0", for example. In the case where the sum weight value is greater than or equal to "10", for example, the recognition result determiner 117 determines that the speech is spoken to the device 1.

Note that the first to seventh weight values are not restricted to the above values and may be other values. In addition, the certain value with which the sum weight value is compared is not restricted to the above value and may be another value. In addition, the weight value calculator 116 may use some of the first to seventh weight values, instead of using all of the first to seventh weight values, to calculate a weight value for the recognition result determiner 117 to determine whether the speech is spoken to the device 1.

In addition, in the weight value table, the determination result that the sentence pattern of character information is not interrogative or imperative may be associated with a certain weight value. In addition, in the weight value table, the determination result that a silent time from when obtaining of speech information is completed to when obtaining of the next speech information is started is not greater than or equal to a certain time may be associated with a certain weight value. In addition, in the weight value table, the determination result that a pre-stored keyword is not included in character information may be associated with a certain weight value. In addition, in the weight value table, the determination result that a pre-stored personal name or nickname is not included in character information may be associated with a certain weight value. In addition, in the weight value table, the determination result that the conjugated form of a declinable word or phrase included in character information is not imperative may be associated with a certain weight value.

In addition, in the weight value table, the determination result that speech information is obtained after a silent time lasts for a certain time or longer and a silent time lasts for the certain time or longer after obtaining of the speech information is completed may be associated with a certain weight value.

According to the above configuration, in the case where weight values given in accordance with certain determination results for character information are added and the sum weight value is greater than or equal to a certain value, it is determined that the speech is spoken to the device. Thus, the user can speak without paying attention to a specific keyword that serves as a trigger for starting speech recognition, and the user can operate the device using daily conversation.

Note that, in calculation of the fifth weight value, in order to determine from a conversation between two or more people whether the speech is spoken to the device, the condition that whether a time from the end of the previous speech to the start of this speech is less than or equal to a preset time threshold may be set.

Note that, in the first to seventh embodiments, it is preferable that the device 1 include an information terminal such as a smart phone, a tablet computer, or a mobile phone. In this case, the operation instruction includes the operation instruction to obtain weather forecast for a day specified by a user and output the obtained weather forecast. For example, when the speech obtainer 101 obtains the speech information "Ashitano tenkiwo oshiete (Tell me the weather for tomorrow)", the operation instruction generator 104 generates the operation instruction to obtain the weather forecast for the next day. The operation instruction generator 104 outputs the generated operation instruction to the mobile terminal.

In addition, in the first to seventh embodiments, it is preferable that the device 1 include a lighting device. In this case, the operation instruction includes the operation instruction to turn on the lighting device and the operation instruction to turn off the lighting device. For example, when the speech obtainer 101 obtains the speech information "Denkiwo tsukete (Turn on the lighting device)", the operation instruction generator 104 generates the operation instruction to turn on the lighting device. The operation instruction generator 104 outputs the generated operation instruction to the lighting device.

In addition, in the first to seventh embodiments, it is preferable that the device 1 include a faucet device that automatically turns on water from an outlet. In this case, the operation instruction includes the operation instruction to turn on water from the faucet device, and the operation instruction to turn off water coming from the faucet device. For example, when the speech obtainer 101 obtains the speech information "Mizuwo 400 cc dashiete (Turn on 400 cc of water)", the operation instruction generator 104 generates the operation instruction to turn on 400 cc of water from the faucet device. The operation instruction generator 104 outputs the generated operation instruction to the faucet device.

In addition, in the first to seventh embodiments, it is preferable that the device 1 include a television. In this case, the operation instruction includes the operation instruction to change the channel of the television. For example, when the speech obtainer 101 obtains the speech information "4 channel ni kaete (Change the channel to 4)", the operation instruction generator 104 generates the operation instruction to change the channel of the television to 4. The operation instruction generator 104 outputs the generated operation instruction to the television.

In addition, in the first to seventh embodiments, it is preferable that the device 1 include an air conditioner. In this case, the operation instruction includes the operation instruction to start the operation of the air conditioner, the operation instruction to stop the operation of the air conditioner, and the operation instruction to change the preset temperature of the air conditioner. For example, when the speech obtainer 101 obtains the speech information "Kuchono ondowo agete (Raise the temperature of the air conditioner)", the operation instruction generator 104 generates the operation instruction to raise the preset temperature of the air conditioner. The operation instruction generator 104 outputs the generated operation instruction to the air conditioner.

Note that the above-described specific embodiments mainly include the disclosure with the following configuration.

A speech recognition method according to an aspect of the present disclosure includes: a speech information obtaining step of obtaining speech information representing speech spoken by a user; a speech recognition step of recognizing the speech information, obtained in the speech information obtaining step, as character information; and a speaking determination step of determining whether the speech is spoken to a device, on the basis of the character information recognized in the speech recognition step.

According to this configuration, speech information representing speech spoken by a user is obtained. The obtained speech information is recognized as character information. On the basis of the recognized character information, it is determined whether the speech is spoken to a device.

Therefore, since whether the speech is spoken to a device is determined on the basis of the recognized character information, speaking of a specific keyword that serves as a trigger for starting speech recognition becomes unnecessary. Therefore, the user can speak without paying attention to a specific keyword that serves as a trigger for starting speech recognition, and the user can operate the device using daily conversation.

In addition, it is preferable that the above-described speech recognition method further include an operation instruction generation step of generating, in the case where it is determined in the speaking determination step that the speech is spoken to the device, an operation instruction for the device.

According to this configuration, in the case where it is determined that the speech is spoken to the device, an operation instruction for the device is generated. Therefore, in the case where it is determined that the speech is spoken to the device, an operation instruction for the device is generated; and, in the case where it is determined that the speech is not spoken to the device, no operation instruction for the device is generated. Thus, speaking a specific keyword that serves as a trigger for starting speech recognition becomes unnecessary.

In addition, in the above-described speech recognition method, it is preferable that the speaking determination step analyze the sentence pattern of the character information, determine whether the sentence pattern is interrogative or imperative, and, in the case where the sentence pattern is interrogative or imperative, determine that the speech is spoken to the device.

According to this configuration, the sentence pattern of character information is analyzed, whether the sentence pattern is interrogative or imperative is determined, and, in the case where the sentence pattern is interrogative or imperative, it is determined that the speech is spoken to the device.

In the case where the sentence pattern is interrogative or imperative, it is highly likely that the speech is spoken to the device. Therefore, the fact that the speech is spoken to the device can be easily determined by determining whether the sentence pattern is interrogative or imperative.

In addition, it is preferable that the above-described speech recognition method further include a time measurement step of measuring, as a silent time, a time since obtaining of the speech information is completed, and a time determination step of determining, in the case where the speech information is obtained, whether the silent time measured in the time measurement step is greater than or equal to a certain time. It is preferable that the speaking determination step determine that the speech is spoken to the device in the case where it is determined that the silent time, which is measured, is greater than or equal to the certain time.

According to this configuration, a time since obtaining of speech information is completed is measured as a silent time, and, in the case where speech information is obtained, it is determined whether the measured silent time is greater than or equal to a certain time. In the case where it is determined that the measured silent time is greater than or equal to the certain time, it is determined that the speech is spoken to the device.

In the case where speech information is obtained after a silent time in which no speech information is obtained lasts for the certain time, it is highly likely that the speech is spoken to the device. Therefore, the fact that the speech is spoken to the device can be easily determined by determining whether a silent time from when obtaining of speech information is completed to when the next speech information is obtained is greater than or equal to a certain time.

In addition, it is preferable that the above-described speech recognition method further include a keyword storage step of storing in advance a certain keyword regarding an operation of the device. It is preferable that the speaking determination step determine whether the keyword, which is stored in advance, is included in the character information, and, in the case where the keyword is included in the character information, determine that the speech is spoken to the device.

According to this configuration, a certain keyword regarding the operation of the device is stored in advance. It is determined whether the pre-stored keyword is included in character information, and, in the case where the keyword is included in the character information, it is determined that the speech is spoken to the device.

Therefore, the fact that the speech is spoken to the device can be easily determined by storing in advance a certain keyword regarding the operation of the device, and determining whether the keyword is included in character information.

In addition, it is preferable that the above-described speech recognition method further include a personal name storage step of storing in advance a personal name. It is preferable that the speaking determination step determine whether the personal name, which is stored in advance, is included in the character information, and, in the case where the personal name is included in the character information, determine that the speech is not spoken to the device.

According to this configuration, a personal name is stored in advance. It is determined whether the pre-stored personal name is included in character information, and, in the case where the personal name is included in the character information, it is determined that the speech is not spoken to the device.

In the case where the personal name is included in the character information, it is highly likely that the speech is not spoken to the device, but is spoken to a person with the personal name. Therefore, the fact that the speech is spoken to the device can be easily determined by storing in advance a personal name, and determining whether the personal name is included in character information.

In addition, it is preferable that the above-described speech recognition method further include a detection step of detecting a person in a space where the device is located. It is preferable that the speaking determination step determine that the speech is not spoken to the device in response to detection of a plurality of people in the detection step, and determine that the speech is spoken to the device in response to detection of one person in the detection step.

According to this configuration, a person in a space where the device is located is detected. In response to detection of a plurality of people, it is determined that the speech is not spoken to the device; and, in response to detection of one person, it is determined that the speech is spoken to the device.

In the case where there is a plurality of people in a space where the device is located, it is highly likely that the user's speech is spoken to another person. In addition, in the case where there is only one person in a space where the device is located, it is highly likely that the user' speech is spoken to the device. Therefore, the fact that the speech is spoken to the device can be easily determined by detecting the number of people in a space where the device is located.

In addition, in the above-described speech recognition method, it is preferable that the speaking determination step determine whether the conjugated form of a declinable word or phrase included in the character information is imperative, and, in the case where the conjugated form is imperative, determine that the speech is spoken to the device.

According to this configuration, it is determined whether the conjugated form of a declinable word or phrase included in character information is imperative, and, in the case where the conjugated form is imperative, it is determined that the speech is spoken to the device.

In the case where the conjugated form of a declinable word or phrase included in character information is imperative, it is highly likely that the speech is spoken to the device. Therefore, the fact that the speech is spoken to the device can be easily determined by determining whether the conjugated form of a declinable word or phrase included in character information is imperative.

In addition, it is preferable that the above-described speech recognition method further include a weight value calculation step of adding weight values given in accordance with certain determination results for the character information. It is preferable that the speaking determination step determine whether a sum of the weight values added in the weight value calculation step is greater than or equal to a certain value, and, in the case where the sum of the weight values is greater than or equal to the certain value, determine that the speech is spoken to the device.

According to this configuration, weight values given in accordance with certain determination results for character information are added. It is determined whether the sum weight value is greater than or equal to a certain value, and, in the case where the sum weight value is greater than or equal to the certain value, it is determined that the speech is spoken to the device.

Therefore, weight values given in accordance with certain determination results for character information are added, and it is determined in accordance with the sum weight value whether the speech is spoken to the device. Thus, the fact that the speech is spoken to the device can be accurately determined by changing the values of the weight values in accordance with certain determination results for character information.

In addition, in the above-described speech recognition method, it is preferable that the weight value calculation step add the following: a weight value given in accordance with whether the sentence pattern of the character information is interrogative or imperative; a weight value given in accordance with whether a silent time, which is a measured time since obtaining of the speech information is completed, is greater than or equal to a certain time, in response to obtaining of the speech information; a weight value given in accordance with whether a pre-stored certain keyword regarding the operation of the device is included in the character information; a weight value given in accordance with whether a pre-stored personal name is included in the character information; a weight value given in accordance with whether a plurality of people is detected in a space where the device is located; and a weight value given in accordance with whether the conjugated form of a declinable word or phrase included in the character information is imperative.

According to this configuration, the following are added: a weight value given in accordance with whether the sentence pattern of character information is interrogative or imperative; a weight value given in accordance with whether a silent time from when obtaining of speech information is completed to when obtaining of the next speech information is started is greater than or equal to a certain time; a weight value given in accordance with whether a pre-stored certain keyword regarding the operation of the device is included in the character information; a weight value given in accordance with whether a pre-stored personal name is included in the character information; a weight value given in accordance with whether a plurality of people is detected in a space where the device is located; and a weight value given in accordance with whether the conjugated form of a declinable word or phrase included in the character information is imperative.

Therefore, these weight values weight values are added, and whether the speech is spoken to the device is determined in accordance with the sum weight value. Therefore, the fact that the speech is spoken to the device can be more accurately determined.

In addition, in the above-described speech recognition method, it is preferable that the device include a mobile terminal, the operation instruction include the operation instruction to obtain weather forecast for a day specified by the user and to output the obtained weather forecast, and the operation instruction generation step output the generated operation instruction to the mobile terminal.

According to this configuration, the weather forecast for a day specified by the user can be obtained, and the obtained weather forecast can be output from the mobile terminal.

In addition, in the above-described speech recognition method, it is preferable that the device include a lighting device, the operation instruction include the operation instruction to turn on the lighting device and the operation instruction to turn off the lighting device, and the operation instruction generation step output the generated operation instruction to the lighting device.

According to this configuration, the lighting device can be turned on or the lighting device can be turned off using speech.

In addition, in the above-described speech recognition method, it is preferable that the device include a faucet device that automatically turns on water from an outlet, the operation instruction include the operation instruction to turn on water from the faucet device, and the operation instruction to turn off water coming from the faucet device, and the operation instruction generation step output the generated operation instruction to the faucet device.

According to this configuration, water can be turned on from the faucet device or water coming out from the faucet device can be turned off using speech.

In addition, in the above-described speech recognition method, it is preferable that the device include a television, the operation instruction include the operation instruction to change the channel of the television, and the operation instruction generation step output the generated operation instruction to the television.

According to this configuration, the channel of the television can be changed using speech.

A speech recognition apparatus according to another aspect of the present disclosure includes a speech information obtainer that obtains speech information representing speech spoken by a user; a speech recognizer that recognizes the speech information, obtained by the speech information obtainer, as character information; and a determiner that determines, based on the character information recognized by the speech recognizer, whether the speech is spoken to a device.

According to this configuration, speech information representing speech spoken by a user is obtained. The obtained speech information is recognized as character information. On the basis of the recognized character information, it is determined whether the speech is spoken to a device.

Therefore, since whether the speech is spoken to a device is determined on the basis of the recognized character information, speaking of a specific keyword that serves as a trigger for starting speech recognition becomes unnecessary. Therefore, the user can speak without paying attention to a specific keyword that serves as a trigger for starting speech recognition, and the user can operate the device using daily conversation.

Note that specific embodiments or examples discussed in the section of the embodiments for making the disclosure are only intended to clarify the technical contents of the present disclosure and should not be narrowly interpreted to limit the present disclosure to such specific examples. Various modifications are permissible within the spirit of the present disclosure and the scope of the following claims.

INDUSTRIAL APPLICABILITY

A speech recognition method and a speech recognition apparatus according to the present disclosure can dispense with speaking of a specific keyword for starting speech recognition and are effective as a speech recognition method and a speech recognition apparatus that recognize input speech and control a device on the basis of the recognition result.

REFERENCE SIGNS LIST 1 device
11 communicator
12 controller
13 memory
14 microphone
15 loudspeaker
16 display
100 speech recognition apparatus
101 speech obtainer
102 speech recognition processor
103 recognition result determiner
104 operation instruction generator

What is claimed is:
1. A speech recognition method in a system that controls a plurality of devices by using speech recognition, comprising:
 obtaining speech information representing speech spoken by a user;

determining whether the speech information identifies one device of the plurality of devices, based on content of the speech information;

generating, in a case where it is determined that the content of the speech information identifies the one device, an operation instruction for the identified one device;

determining whether the speech is spoken to the identified one device by analyzing a sentence pattern of the speech information, which includes determining whether the sentence pattern is interrogative, determining whether the sentence pattern is imperative, determining whether the sentence pattern is declarative, determining whether the sentence pattern is exclamatory, determining, in a case where the sentence pattern is interrogative or imperative, that the speech is spoken to the identified one device, and determining, in a case where the sentence pattern is declarative or exclamatory, that the speech is not spoken to the identified one device, wherein the operation instruction is executed by the identified one device when the speech is determined to be spoken to the identified one device based on the determined content and sentence pattern.

2. A speech recognition apparatus that controls a plurality of devices by using speech recognition, comprising:

one or more memories; and circuitry that performs operations, including obtaining speech information representing speech spoken by a user;

determining, whether the speech information identifies one device of the plurality of devices, based on content of the speech information;

generating, in a case where it is determined that the content of the speech information identifies the one device, an operation instruction for the identified one device, determining whether the speech is spoken to the identified one device by analyzing a sentence pattern of the speech information, which includes determining whether the sentence pattern is interrogative, determining whether the sentence pattern is imperative, determining whether the sentence pattern is declarative, determining whether the sentence pattern is exclamatory, determining, in a case where the sentence pattern is interrogative or imperative, that the speech is spoken to the identified one device, and determining, in a case where the sentence pattern is declarative or exclamatory, that the speech is not spoken to the identified one device, wherein the operation instruction is executed by the identified one device when the speech is determined to be spoken to the identified one device based on the determined content and sentence pattern.

* * * * *